US00RE34418E

United States Patent [19]

Bates et al.

[11] E Patent Number: Re. 34,418

[45] Reissued Date of Patent: Oct. 26, 1993

[54] APPARATUS AND METHOD FOR INTRODUCING SUBSTANCES INTO LIQUID METAL

[75] Inventors: Kenneth W. Bates; William A. Griffiths, both of Chesterfield, England

[73] Assignee: Injectall Limited, Sheffield, England

[21] Appl. No.: 164,432

[22] Filed: Mar. 4, 1988

Related U.S. Patent Documents

Reissue of:

[64] Patent No.: 4,575,393
Issued: Mar. 11, 1986
Appl. No.: 629,782
Filed: Nov. 21, 1983

[30] Foreign Application Priority Data

| | | | |
|---|---|---|---|
| Nov. 23, 1982 | [GB] | United Kingdom | 8233300 |
| Apr. 21, 1983 | [GB] | United Kingdom | 8310814 |
| Jun. 1, 1983 | [GB] | United Kingdom | 8315025 |

[51] Int. Cl.[5] ..... C21C 7/00

[52] U.S. Cl. ..... 75/414; 266/216; 266/225; 266/280

[58] Field of Search ..... 266/207, 218; 75/53, 75/58, 68 R

[56] References Cited

U.S. PATENT DOCUMENTS

| | | | |
|---|---|---|---|
| 2,698,749 | 1/1955 | Fishell | 266/207 |
| 2,805,147 | 9/1957 | Schreiber | 266/207 |
| 2,855,293 | 10/1958 | Savard et al. | 75/60 |
| 3,137,753 | 6/1964 | Feichtinger | 266/218 |
| 3,539,667 | 11/1970 | Nameishi | 264/56 |
| 3,917,240 | 11/1975 | Tanoue | 266/216 |
| 3,971,548 | 7/1976 | Folgero | 266/218 |
| 4,154,604 | 5/1979 | Gruner | 75/414 |
| 4,248,192 | 11/1981 | Barbakadze | 266/218 |
| 4,295,883 | 10/1981 | Lajh | 75/414 |
| 4,296,920 | 10/1981 | Miller | 266/216 |
| 4,423,858 | 3/1984 | Ostlund | 266/270 |

FOREIGN PATENT DOCUMENTS

| | | |
|---|---|---|
| 2004159 | 11/1971 | Fed. Rep. of Germany . |
| 3115108 | 10/1982 | Fed. Rep. of Germany . |
| 2633025 | 11/1982 | Fed. Rep. of Germany . |

(List continued on next page.)

OTHER PUBLICATIONS

Use of Magnesium Wire Injection for the Desulphurization of Pig Iron, M. C. Ashton et al., Ironmaking and Steelmaking (Quarterly), 1975, 1976 No. 2.

Blocking in Horizontal Nozzles During Injection of Gas Into Liquid Cast Iron, Davis et al., Metals Technology, Jan. 1979.

Bubbling-Jetting Phenomena in Powder Injection Into Liquid, Ozawa et al., Transactions ISIJ, vol. 23, 1983.

Model Studies of Clogging in Tuyeres and Lances, Engh et al., Scandinavian Journal of Metallurgy 5 (1975) 21-26.

*Primary Examiner*—Peter D. Rosenberg
*Attorney, Agent, or Firm*—Buchanan, Ingersoll

[57] ABSTRACT

For the introducing gases, wires and powders to metal melts, a multi-ducted refractory body is installed in the wall of a vessel for the melt. The body has passage closing elements preventing melt entering the passages (A, B, C). Two passages (A and C) serve respectively for introducing gas, and fluidized powders, to the melt; each has a movable pipe (for gas or fluidized powder). Upon moving the gas pipe towards the melt, it dislodges closing element whereby gas from the pipe can enter the melt via capillar bores. Wire is fed along passage (B) to the melt: when it reaches the closing element the wire can itself dislodge this element to gain access to the melt. A method of introducing substances to liquid related to use of this apparatus is disclosed, as well as metallurgical process involving the method.

33 Claims, 5 Drawing Sheets

FOREIGN PATENT DOCUMENTS

| | | |
|---|---|---|
| 62579 | 8/1940 | U.S.S.R. . |
| 289128 | 11/1971 | U.S.S.R. . |
| 735640 | 5/1980 | U.S.S.R. . |
| 741030 | 6/1980 | U.S.S.R. . |
| 796242 | 1/1981 | U.S.S.R. . |
| 891786 | 12/1981 | U.S.S.R. . |
| 808145 | 1/1959 | United Kingdom . |
| 1083600 | 9/1967 | United Kingdom . |
| 1119314 | 7/1968 | United Kingdom . |
| 1281012 | 7/1972 | United Kingdom . |
| 1318486 | 5/1973 | United Kingdom . |
| 1351618 | 5/1974 | United Kingdom . |
| 1551451 | 8/1979 | United Kingdom . |
| 1575603 | 9/1980 | United Kingdom . |
| 2041182A | 9/1980 | United Kingdom . |
| 1594631 | 8/1981 | United Kingdom . |
| 2093169A | 8/1982 | United Kingdom . |
| 2094954 | 9/1982 | United Kingdom . |
| 2102926A | 2/1983 | United Kingdom . |

APPARATUS AND METHOD FOR INTRODUCING SUBSTANCES INTO LIQUID METAL

Matter enclosed in heavy brackets [ ] appears in the original patent but forms no part of this reissue specification; matter printed in italics indicates the additions made by reissue.

TECHNICAL FIELD AND BACKGROUND

The present invention relates to apparatus for treating liquids at elevated temperatures by introduction of substances thereto. Treatment may be performed on the liquid while in a vessel of some kind or while flowing along a conduit or channel.

Liquids to be treated will ordinarily be at such high temperatures that they may be regarded as aggressive or dangerous. The apparatus we have developed has been designed to be safe in operation as well as adequately protected from the liquid up to the time treatment is to begin.

Exemplary liquids for treatment include molten slags and metals. Regarding metals, both ferrous and non-ferrous melts may be treated for diverse purposes using the present apparatus. Apparatus to be described has been designed principally, but not exclusively, for introducing gases, powders and solids to ferrous melts.

The apparatus could also be used in winning or refining selected metals from their ores. For example, tungsten can be won by reduction in an arc furnace of the ore or an oxide thereof to the molten metallic state. The present apparatus can be employed to blow fresh powdered ore or oxide into the metallic melt of the furnace.

The apparatus disclosed hereinafter in detail can be employed when making steel from iron. It is suitable for use in vacuum degassing as a convenient means to introduce alloying additions. Primary and secondary refining, deoxidizing and desulphurizing can be performed to advantage with the aid of the apparatus. Compositions of steels (and other metals) can be controlled or modified by introducing gaseous, solid or powdered substances at any time before solidification. For instance, the melt can be treated in the furnace, in the ingot mould, as well as in vessels such as steelmaking vessels, ladles of various kinds, degassers and tundishes.

Before or during teeming in a metal casting operation, it may be necessary or desirable to introduce gas into the molten metal in a container or vessel. Gas is injected, e.g. into the bottom area of a vessel, for diverse purposes. These include rinsing; clearing the relatively cool bottom area of solidification products, to help remove them from the vicinity of a vessel bottom outlet from which the metal may be teemed; equalising the temperature throughout the melt; and stirring to help disperse alloying additions uniformly in the melt. Usually an inert gas such as argon is used. Reactive gases such as oxygen, carbon dioxide and hydrocarbon gases are sometimes substituted, depending on the melt chemistry.

Previous gas injection proposals have envisaged porous bricks in the refractory lining of a vessel, solid porous plugs in sliding gate teeming valves, and conventional consumable lances. Installations featuring porous bricks have the virtue of simplicity. Unfortunately, a porous brick exposed to the interior of the vessel may be rendered inoperative if metal slags or metal oxides freeze on it, e.g. between emptying the vessel and refilling it. Moreover, when refilling, these bricks could be damaged through impact of the molten metal thereon or through thermal shock. Unexpected failure of the brick can have extremely dangerous consequences. Visual inspection to detect the onset of failure is far from easy from a distance, looking down into the vessel.

Sliding gate valves adapted for gas injection may be safer, but unless overly complicated they are not able to offer the possibility of gas injection simultaneously with teeming.

Conventional lances are somewhat cumbersome, costly and not without their dangers in view of the splashing their use engenders.

Among other things, the present invention aims to overcome the above drawbacks associated with prior gas injection systems. The apparatus disclosed hereinafter is capable of introducing substances deep into a metal melt and provides benefits not so readily attainable by the consumable lances conventionally employed.

In ferrous metallurgy, the melt must often be deoxidised and desulphurised by introducing aluminium and calcium or its alloys. Compositions control or "trimming" is commonly performed by dissolving solid or powdered alloying additions in the melt. Many materials can be added to melts to overcome the deleterious effects of impurities or to tailor the melts to produce specified compositions. We do not propose to provide an exhaustive catalogue of possible treatment materials. The choice of materials will depend on the melts, their starting and finishing compositions; it is well within the purview of the works chemist or metallurgist to choose appropriate addition(s) as each situation demands. Introducing additions to a steel melt—or indeed any other metal melt—can be troublesome especially if the alloying addition is readily melted, oxidised or vaporised. Thus, adding aluminium to a steel melt can be a difficult operation in view of the low melting point of aluminium. No significant deoxidation would be achieved if the aluminium were simply dumped onto the melt: it has to be delivered deep into the melt so it has time to liquify and react rather than float ineffectively on top of the melt. Calcium moieties have to be fed deep into the melt. Previous delivery methods include use of a lance or sophisticated and expensive equipment for firing the alloying addition deep into the melt. Lancing is apparently simple but has drawbacks as intimated above.

The apparatus disclosed hereinafter facilitates the introduction of alloying or treatment additions in powder or solid form deep into a metal melt. By means of this apparatus, precise dosing of the melt is a very straightforward operation. In its preferred form, inert or reactive gases can be blown into the melt in the course of introducing powders or solids.

DISCLOSURE OF INVENTION

According to the present invention, there is provided apparatus suitable for introducing substances into an elevated temperature liquid comprising a refractory body adapted to be installed in a wall of a liquid container below the liquid surface, the body being traversed by a passage for conveying a chosen substance to the liquid, where the passage has a dislodgeable, refractory passage-closing means at a liquid-confronting end of the body to prevent liquid entering the passage, and an element movable in the passage and engageable with the closing means, and wherein there are actuating means operative to propel the movable element at the closing means to dislodge the latter opening the passage, thereby allowing feeding of the substance into the liquid to commence.

The apparatus can take several forms, whichever best suits the form of passage for delivering gases, wires or powders to the liquid. The apparatus preferably has plural passages enabling different substances e.g. in different physical states to be delivered in substantially any chosen order to the liquid.

The liquid to be treated by means of the apparatus will primarily, but not exclusively, be a metal melt.

For introducing a gaseous substance, the liquid or melt end of the body can be pierced by a plurality of capillary bores to be fed with gas from a plenum for conveying passage conveys the gas to the plenum. In this case the closing element covers the liquid- or melt-confronting face of the body to prevent premature entry of liquid melt into the capillary bores. The movable member can be a gas pipe inside the body; the pipe can have an end-closing element fast therewith for striking the protective closing element to expose the end of the body to the melt. The pipe member has openings in its wall for discharging gas into the plenum, which can be formed by a recess in the body and by a confronting portion of the body. More conveniently, the liquid or melt end of the body has a recess or well in which a capillary bored plug is seated, the plug being spaced from the bottom of the well to define the plenum.

The body can have a passage for introducing a particulate substance to the melt, the movable member then being a tube coupled to a fluidiser so as to be supplied with a fluidised stream of gas and particulate substance. The movable member can directly discharge the substance into the melt. By the apparatus, "fines" which otherwise are unsatisfactory for metallurgical use unless consolidated can be injected in their finely-divided state. The movable member can advantageously have a closure which releases the stream suddenly upon the member dislodging the passage closing element. The closure can be made from a metal which liquifies immediately upon contact with the melt.

Any convenient means may be employed to propel the movable member against the dislodgable closing element. A manually operative lever could be provided to displace the movable member, although the lever might be operated e.g. hydraulically. Alternatively, a cocked, spring drive means may be used to displace the movable member suddenly.

Where the substance to be introduced is solid, it is furnished in the form of a strand such as a wire or an elongate sintered or extruded rod. Particulate material could also be supplied as a strand packed in a thin-walled tube. The strand can be driven into the melt by any convenient wire feeder. When introducing the strand to a metal melt, care should be taken to prevent melt entering and freezing in the passage before the strand enters the melt. One approach is to ensure the strand is adjacent the melt end of the passage to avoid undue delay between dislodgement of the closing element and entry of the strand into the melt.

If the strand has adequate lengthwise ridigity, then the strand itself could perform the function of dislodging the closing element at the end of a passage provided in the body for the strand. Should the strand lack rigidity, then it can pass along a movable guide tube which serves as the movable member responsible for dislodging the closing element from the strand passage.

Conveniently, the apparatus includes a means for severing the strand after a chosen length has been fed to the melt. The severing means could comprise a pair of shear bushes through which the strand is threaded before it enters the duct member. The bushes are mounted in supports relatively movable to displace the bushes from registry to sever the strand.

The apparatus can include means to supply an inert gas to the strand passage to protect the strand from oxidation prior to entry to the liquid. The supply and introduction of gas with the strand is, however, optional.

The present apparatus preferably includes at least two duct members, one reserved e.g. for introducing gaseous substances alone and the other for introducing either a particulate substance as a fluidised stream or a solid substance as a strand. If one duct member is to convey a strand, the other preferably conveys gas.

In the preferred form of the apparatus, there are at least three passages, respectively capable of conveying gas, fluidised particles and a solid strand to the liquid. There can be closing elements individual to the passages and one further closing element or shield which covers the melt-confronting face of the body.

The invention embraces vessels such as ladles, moulds, and tundishes, as well as flow ducts fitted with the aforesaid apparatus.

The invention comprehends metallurgical processes wherein metal melts are treated by introducing substances selected from gases, solids and powders to purify, adjust composition, control microstructure of the metal after solidification, and the like wherein the chosen substances are introduced to the liquid melt by use of the present apparatus.

BRIEF DESCRIPTION OF THE DRAWINGS

The various aspects of this invention will now be described in more detail by way of example with reference to the accompanying drawings in which.

MODES FOR CARRYING OUT INVENTION

Figure 1:
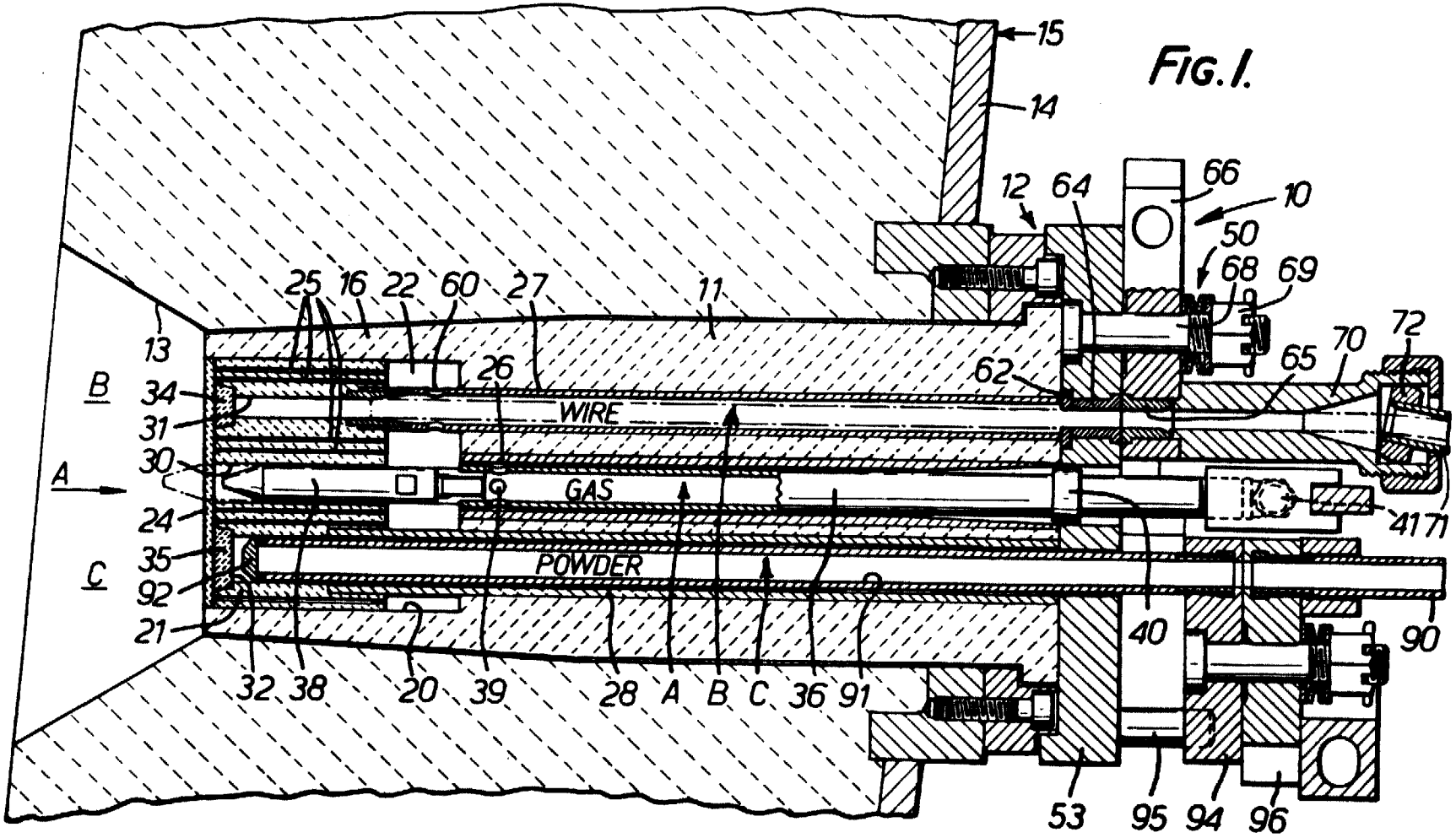
FIG. 1 is a longitudinal cross-section through the preferred embodiment of the invention, this embodiment offering the possibility of introducing solids, powders and gases separately or in combinations to a metal melt.
Figure 2:
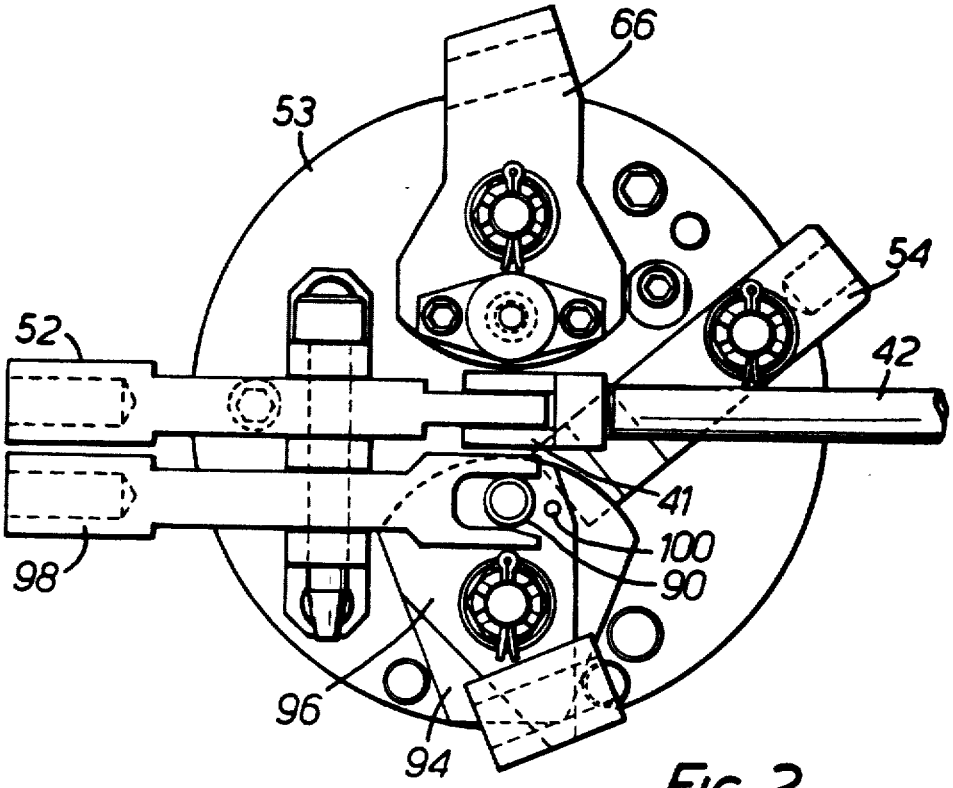
FIG. 2 is an end view of the preferred embodiment.
Figure 3:
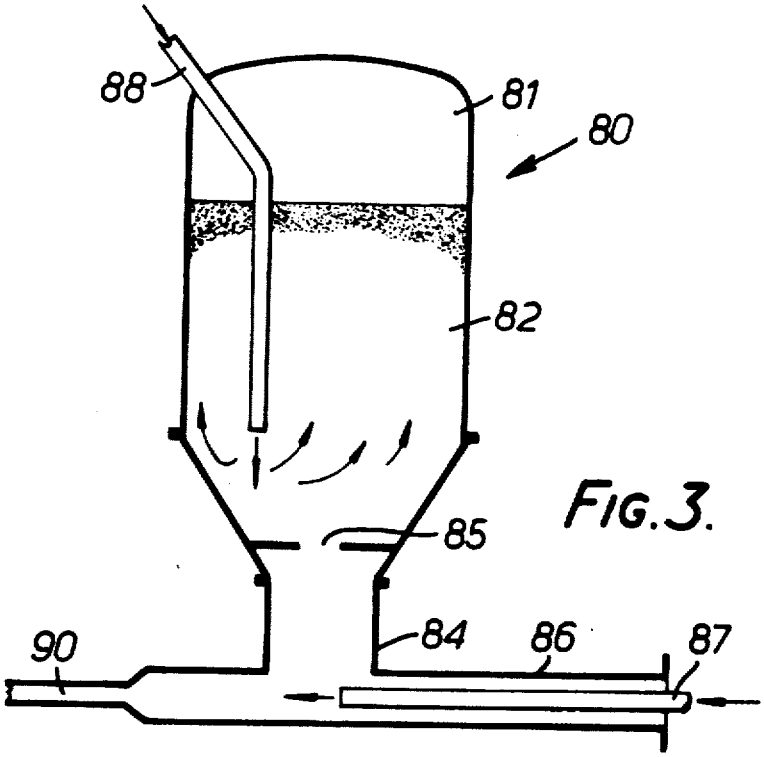
FIG. 3 diagrammatically shows apparatus for providing a mixed stream of powder and gas.

The apparatus 10 illustrated in FIGS. 1 to 3 is constructed and arranged to give the metallurgist a ready means for introducing gases, solids or powders to molten metal contained in a vessel or flowing along a conduit. Gas alone may be injected. Solid alloying additions in rod or wire form can be introduced, normally along with an inert gas. The rod can be a wire as such, or a sintered metal strand, or even a strand formed from adhesively-bound metal particles. For convenience hereinafter, the strand howsoever made will be called a "wire". Alloy or treatment additions in powder form can also be injected with a carrier gas, normally an inert gas such as argon.

Apparatus according to the invention can be constructed specifically to introduce gases only, or wire plus gases, or powders plus gases, but the apparatus 10 provides facilities for introducing all these. The metallurgist may not always need to use the three facilities. He may use one, or a combination of two of the facilities, depending on the actual and desired chemistries of the melt.

The apparatus 10 includes an elongated, cylindrical refractory body 11 having mounting means 12 to secure it leak-tightly in a hole 13 in the wall 14 of a conduit or vessel. In this case, the apparatus is shown attached to a vessel 15 such as a ladle. The vessel has a metal shell and relatively thick refractory inner lining, the shell being apertured coincidentally with the hole 13. To assure leak tightness, the refractory body 11 has a tapered inner end 16 which is thrust against a correspondingly-tapered section of the hole 3 by the mounting means 12. The depth or location of the hole 13 can be chosen as experience demands.

The inner end 16 of the refractory body has a deep cylindrical well 20 formed therein. In this well a refractory plug 21 is secured for easy replacement e.g. by a weak mortar. The plug in this embodiment has its inner end spaced from the bottom of well 20 to form a chamber 22. The opposite end of the plug 21 is set back slightly from the extreme end of the body 11, thereby forming a shallow recess in the inner end 16. A thin, highly refractory disc 24 is seated in this recess. The disc 24 is secured in the recess and is ejected therefrom, as will be described, when the apparatus is activated to introduce e.g. gas to the melt. The disc 24 may be so brittle that it shatters when ejected. The purpose of the disc 24 is to shield the plug 21 from contact with the melt until it is time to introduce gas, wire or powder.

The plug 21 is pierced from one end to the other for ejecting gas into the melt. A single gas passage or a plurality of capillary passages 25 for gas ejection may be provided, the latter being shown in FIG. 1.

If there is a single gas passage instead of capillary passages, and its melt end is suitably closed by a detachable plug, then the thin disc 24 may be omitted.

The apparatus 10 has three separate channels for melt additions to be delivered to the melt. An innermost channel A is for gas. This channel is flanked by channels B and C for introducing wire and powder respectively. The body 11 has three lengthwise bores extending to the well 20, one for each channel. The bores are lined by respective metal tubes 26, 27 and 28. The mounting means 12 has bores to align therewith. The plug 21 likewise has bores 30, 31 and 32 therethrough aligned with tubes 26, 27 and 28. Tubes 27 and 28 extend across the chamber 22 and are secured in the plug bores 31, 32. Plug bores 31, 32 are closed by temporary refractory blocking elements 34, 35 located at the melt end of the plug. These elements 34, 35 can be pushed from their seatings in the plug 21. The tube 26 terminates at the bottom of well 20 and the plug bore 30 aligned therewith has no blocking element equivalent to elements 34, 35.

As just described, and shown in FIG. 1, the channels A, B, C and their associated bores are in line, channel A being central. They could as well be disposed around a circle, at 120° to one another. A circular disposition would be preferred if the apparatus were required to possess extra injection channels.

Gas Injection

Tube 26 of channel A telescopically receives a hollow plunger or gas pipe 36. Fast within the inner end of pipe 36 is a solid tapered rod or bullet 38 slidably received in plug bore 30. Adjacent the bullet 38, the pipe has gas-exit openings 39. Secured to pipe 36 is a tapered collar 40 positioned to coact with a tapered outer end of the tube 26 for sealing purposes. The pipe extends outwardly beyond the refractory body 11, through apertures in the mounting means 12, and terminates in a gas inlet fitting 41 to receive gas from a gas supply conduit 42.

The associated components 36, 38, 40 and 41 are positioned as shown in FIG. 1 prior to a gas injection operation. Shielding disc 24 is in place and bullet 38 is spaced therefrom, while the sealing collar 40 is spaced from the tube 26. With the pipe 36 so positioned, the chosen gas is fed therealong to the chamber 22. Gas feeding may continue long enough to flush air substantially from the apparatus 10. Thanks to a loose fit of pipe 36 in tube 26 and the spacing of collar 40 from the tube, a route is provided for the flushing gas to return from chamber 22 and exhaust from the apparatus 10. This gas exhaust route is sufficient to ensure that the infed gas does not prematurely blow out the shielding disc 24.

The flushing gas cannot escape via tube 27 which in this embodiment it can enter, thanks to mechanism 50 to be described forming a closure for tube 27.

The gas cannot enter the tube 28, and hence cannot escape thereby from the apparatus. Moreover, the gas cannot escape from the apparatus by passing between the refractory of body 11 and the tubes 26, 27, 28. The tubes are gas-tightly cemented in body 11, or the latter is moulded in situ gas-tightly therearound.

To initiate gas injection, the plunger formed by gas pipe 36 is advanced along tube 26 towards the melt. The pipe 36 thrusts the bullet 38 against the shielding disc 24, fracturing or dislodging it and thereby uncovering the capillary passages 25. Gas can then enter the melt after traversing the chamber 22 and the capillary passages 25. As the pipe 36 is advanced, its collar 40 sealingly contacts the inside of tube 26, closing the gas exhaust passage between components 26 and 36. Thanks to this arrangement there is no need to provide a seal between the gas injection channel and a cover plate 53 of the apparatus. After exposure to the melt, the bullet will plug the bore 30 against leakage of melt therealong.

Upon completion of gas injection, the gas supply is simply closed off by valving, not shown. Molten metal may then run into the capillary passages 25 and freeze therein.

To move the plunger constituted by pipe 36, the apparatus is furnished with a lever 52. This is pivoted on a cover plate 53 of the mounting means 12, and has an end engaged with the pipe inlet fitting 41.

Also pivotal on the cover plate 53 is a safety stop 54. The stop 54 is to prevent inadvertent movement of the pipe 36 and premature dislodging or fracturing of disc 24. Movement of the pipe 36 is permitted when the stop is swung to move it out of a position interposed between the fitting 41 and plate 53.

Wire Injection

Wire injection is along channel B, tube 27 and along plug bore 31, after dislodgement of shielding disc 24 and blocking element 34. Wire injection is normally performed in the presence of gas. The gas is supplied via pipe 36, and chamber 22. Gas enters the wire injection tube 27 by way of holes 60 therein.

The tube 27 terminates flush with the outer end of body 11. The cover plate 53 engaging this end of the body has an aperture aligned with tube 27. A seal or gasket 62 provided at the aperture prevents gas leakage at the interface between body 11 and cover plate 53. The cover plate 53 and mechanism 50 contain coacting shear elements of a wire-shearing system. A shear bush 64 is seated on the cover plate aperture aligned with tube 27. A second shear bush 64 is provided in a plate 66 of the mechamism. The plate 66 is arcuately movable on a pivot bolt 68 projecting from the cover plate. A nut and spring washer arrangement 69 retains and thrusts plate 66 against the cover plate 53. By moving the plate 66 to and fro by a lever, not shown, the bushes 64, 65 are moved in or out of registry. They shear a wire threaded therethrough when moved out of registry.

A tubular union 70 is attached to the plate 66 in alignment with shear bush 65. Union 70 couples the apparatus 10 via a tubular conduit 71 to a wire feeder, not shown. The wire feeder can be of any suitable form and construction. The union 70 and conduit 71 meet at a universal joint 72 which accommodates the movements required of the plate 66 and any misalignments.

Plate 66 is shown in its wire-feeding position, the shear bushes 64, 65 being in registry. Until wire feeding commences, the plate 66 is in a position in which the bushes are wholly out of registry. Then plate 66, being thrust against cover plate 53, closes off the aperture through bush 64 and gas cannot escape by passage along tube 27.

For commencing wire injection, gas is fed to the tube 27 as noted above. The plate 66 is then swung about the pivot bolt 68 to align the bushes 64, 65 and the wire feeder is set in operation. The wire travels along conduit 71, into the union 70 and then through the aligned bushes 64, 65. The wire next enters tube 27 and travels therealong in the presence of gas into the plug bore 31. Finally, the end of the wire encounters blocking element 34, which it displaces, and enters the melt.

The wire feeder is kept operative until a chosen amount of wire has been advanced into the melt. The plate 66 is then returned to its original position causing the bushes 64, 65 to shear the wire. The gas feed can then be discontinued. The wire left in the plug bore 31 freezes therein, effectively stopping the bore 31 and ensuring melt cannot escape from the vessel 15 along this bore.

Powder Injection

Powder additions are fed to apparatus 10 and the melt, entrained in a carrier gas such as argon. The gas/-powder mixture is produced in the apparatus 80 shown in FIG. 3. Apparatus 80 includes an enclosed supply hopper 81 containing the chosen powder 82. The bottom of the hopper 81 has a discharge pipe 84 which the powder may enter after passing through a restricted control orifice 85. Pipe 84 opens to the top of an entraining conduit 86 having an internal, coaxially mounted carrier gas supply pipe 87. A gas supply conduit 88 also enters the hopper 81, for fluidising the powder 82. Fluidised powder entering conduit 86 encounters a jet of carrier gas issuing from the supply pipe 87, and is entrained therewith. The mixture of gas and powder enters a conveying pipe 90 which is coupled to channel C of apparatus 10. The gas/powder balance is controlled by varying the gas pressures in the hopper 81 and the entraining conduit 86.

Movably mounted in tube 28 of channel C is a hollow plunger formed by a steel pipe 91 which may have an inner lining e.g. of mullite. The pipe is located with its inner end in plug bore 32, close to the blocking element 35. This end of the pipe is closed by a copper or aluminum cap or plug 92. The other end of pipe 91 extends outwardly from the body 11, and through an aperture in the cover plate 53. The pipe terminates in a bore provided in a plate member 94 spaced from but mounted on the cover plate 53. The mounting for the plate member 94 comprises a guide rod 95 projecting into the cover plate 53. Plate member 94 is movable towards the cover plate 53 to drive the pipe 91 into engagement with the blocking element 35. A companion plate member 96 is pivoted to and pressed against plate member 94, in essentially the same way as movable plate 66 is attached to cover plate 53. The plate member 96 has a bore in which the gas/powder conduit 90 is secured. By pivoting plate member 96, its bore can be brought into and out of alignment with the bore of plate member 94. A lever 98 is pivoted on the cover plate 53 alongside lever 52 for engaging the plate member 96. The lever 98 is bifurcated to fit around the conduit 90.

The plate members 94, 96 and pipe 91 are in the positions shown in FIG. 1 in readiness to inject powder additions. The gas entraining apparatus 80 is set in operation to supply gas and powder to the pipes 90, 91. For the moment, however, the gaseous mixture is prevented from entering the melt due to cap 92 and blocking element 35. To admit gas to the melt, the lever 98 is operated to displace the components 91, 94, 96 as a unit to the left in FIG. 1. The pipe 91 is thus thrust against blocking element 35, forcing the latter out of its seating, and then enters the melt. Upon contacting the melt, cap 92 disintegrates. The gas/powder is thus suddenly admitted to the melt, and the gas pressure prevents melt from entering the pipe 91. When the gas/powder injection is judged complete, the plate member 96 is forcibly swung about its pivot mounting on plate member 94. This shuts off the supply of gas and powder by moving the bores in plate members 94, 96 out of registry. In displacing plate member 96, a shear pin 100 responsible for holding plate members 94, 96 with their bores aligned is fractured. With shut-down of the gas and powder supply, melt can enter the pipe 91 and freeze therein.

Actuation of levers 52, 98 and plates 66, 96 can be accomplished by hand, using suitable crowbars. Safety stop 54 prevents premature actuation of both levers 52 and 98. The levers are actuatable only after moving stop 54 from its illustrated blocking position.

When injections along channels A and C are completed, there is some risk of the melt thrusting lance pipes 36 and 91 to the right as seen in FIG. 1, owing to the metallostatic head in the vessel 15. To guard against this, some form of safety lock can be incorporated. For example, the levers 52, 98 could be associated with a ratchet detent to hold them in the actuated positions.

If desired, the actuation of levers 52, 98 and plates 66, 96 could be performed by motors or hydraulic actuators. Then, it may be possible to dispense with safety locks.

Operational Conditions

Gas flow rates and the amounts of solid or powder additions will, of course, be governed by factors determined by the works chemist or metallurgist. Accordingly, hard and fast rules cannot be given. In the following description, operational conditions are given solely for illustrative purposes, for treating a steel melt in a ladle of 15 tonne capacity.

Gas consumption may be 0.5 to 12 standard cu ft/min (SCFM) (0.85 to 20.4 standard $m^3/h$) at injection pressures in the range of 35 to 40 psi (2.4 to 2.7 bar) along channel A.

The amount of wire to be fed into the ladle may be 1 to 1.36 kg per tonne of steel therein.

Powder to be fed into the ladle may be 30 mesh or smaller. 10 lbs (4.5 kg) per tonne may be required. The powder feed rate may be 1 lb (0.45 kg) per standard cubic foot (28.3 liters) of gas supplied. The gas pressure in the apparatus 80 may be 35 to 40 psi (2.4 to 2.7 bar), the maximum permissible being 100 psi (6.9 bar). The powder/gas mixture mixture may enter the melt through a pipe 91 of ¼" inside diameter (6.4 mm) at a speed of 0.5 Mach and upwards.

When use of the apparatus 10 is over and the vessel 15 is emptied, the apparatus is dismounted therefrom by unbolting the cover plate 53 from the mounting means 12. Tubes 36, 91 and plug 21 are driven from the body 11 and replaced. New blocking elements 34, 35 and disc 24 are fitted, either before or after installing the new plug 21. The body 11 is then refitted in the vessel wall 14 and the cover plate 53 bolted in place to thrust the body 11 firmly into its tapered seating. In the course of preparing the apparatus 10 for re-use, the stop member 54 will be placed in its safety position mentioned earlier, preventing premature or inadvertent operation of levers 52 and 98. Movable plate 66 will be positioned such that shear bushes 64, 65 are wholly out of registry. Plate members 94 and 96 will be positioned with their bores for passing gas and powder in line, and a new shear pin 100 will be inserted.

Except for components 11, 21, 24, 34, 35 and 38 or otherwise noted herein, the apparatus will be constructed from common engineering materials e.g. steels. The components just enumerated will be made from refractory materials. The shielding disc 24 may be made from a high alumina material. Elements 34, 35 and 38 may be similarly made from high alumina refractory. Concrete may be chosen for preference. Body 11 and plug 21 can be pressed and fired refractory bodies, but again it may be preferable, at least for plug 21, to cast from high alumina refractory concrete.

The body 11 should survive several treatment operations, but its replacement cost will not be unduly high if made from concrete. The cost of replacing components 21, 24, 34, 35 and 38 will likewise be negligible. Replacement of the tube 36 will involve minimal expense, but it may be reused repeatedly if the bullet 38, which contacts the melt, is made readily detachable therefrom.

As indicated, all the refractory components and some, or if desired all, the delivery pipes can be replaced: the design has been developed with ease of replacement in mind. For convenience, the user may hold a stock of replacement bodies complete with their pipes, plugs, shields and blocking elements. By this means, the time needed for preparation of vessels for refilling can be kept to the very minimum.

The chemist or metallurgist may on occasion have no need to inject gas alone. He may be content to inject either or both solid and powder additions. In that event, there will be no need to operate the lever 52. The disc 24 will be unseated or broken when either establishing the wire feed or operating the powder feed lever 98, upon the respective blocking element 34, 35 being thrust by the advancing wire or the pipe 91 towards the melt.

The apparatus 10 according to the invention is well adapted for mounting deep in a vessel or conduit, thereby ensuring that treatment or alloying additions enjoy ample time for dispersal in the melt. The likelihood of such additions ineffectually rising to the slag atop a metal melt is therefore minimised.

Apparatus now to be described has features suitable for incorporation in the apparatus described above. In this apparatus, wire will normally be fed in conjunction with gas, but as will become apparent, gas alone may be injected. This apparatus is shown in FIGS. 4, 5 and 6 and components thereof having counterparts in apparatus 10 are similarly numbered, but are prefixed by number 2, i.e. the references start at 210 for this apparatus.

Figure 4:
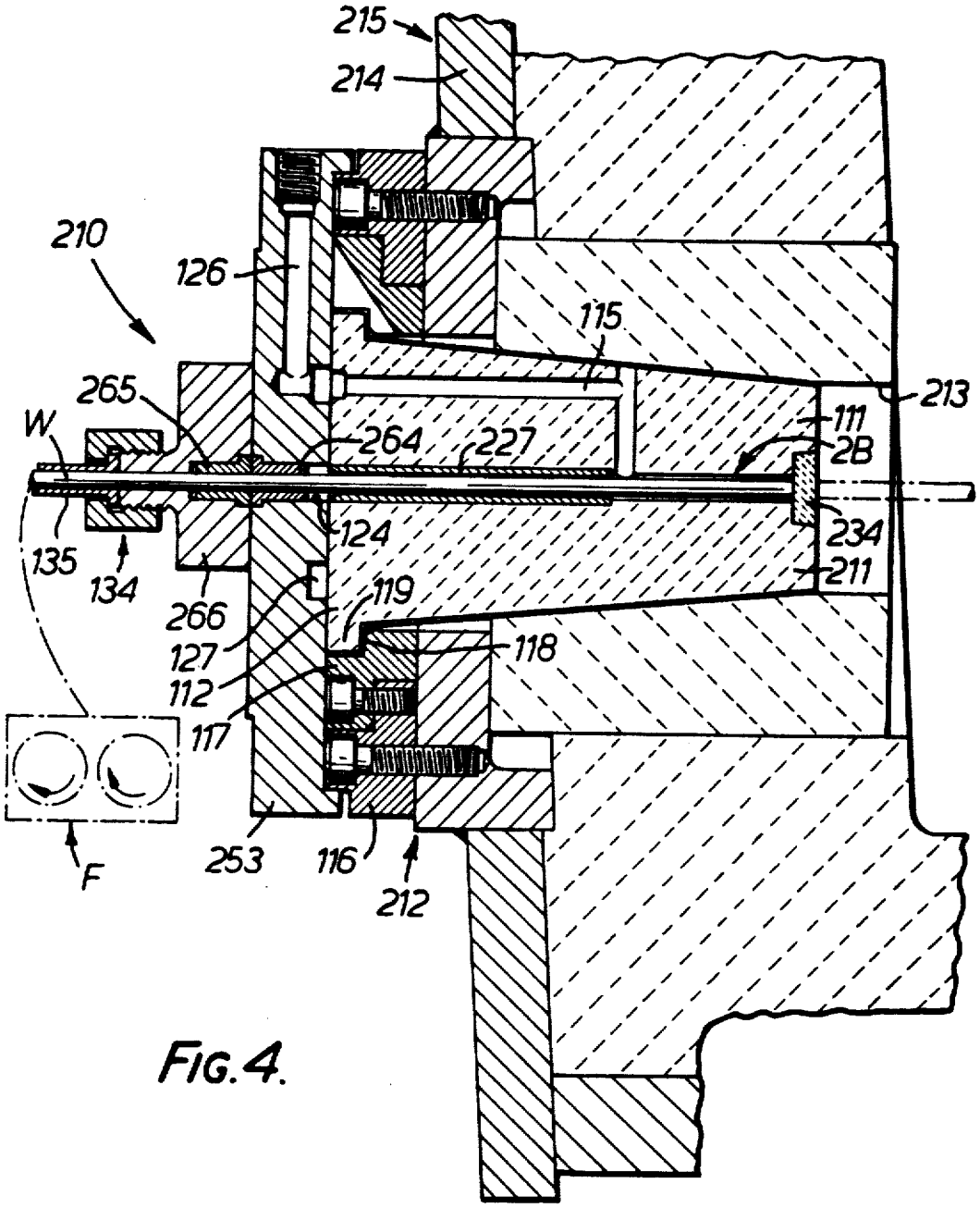
FIG. 4 is a fragmentary vertical sectional view through part of a vessel to which is fitted a wire injecting apparatus.
Figure 5:
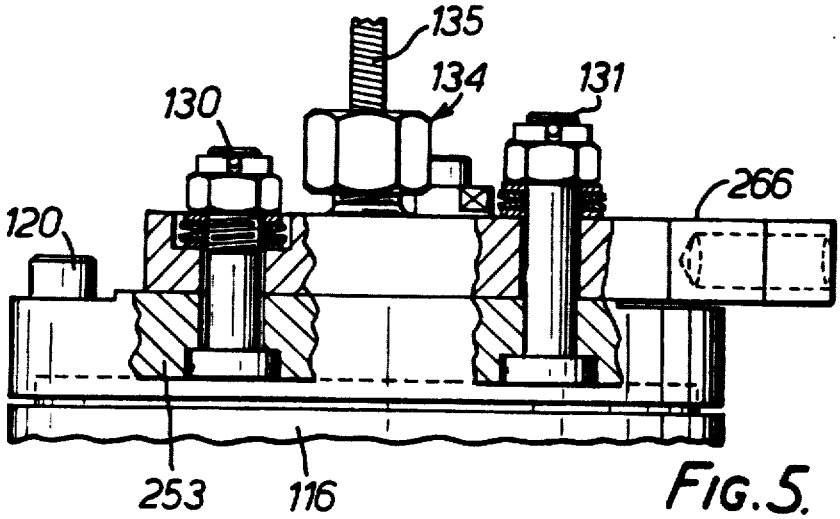
FIG. 5 is a side view, partially in cross section of a portion of the apparatus shown in FIG. 4.
Figure 6:
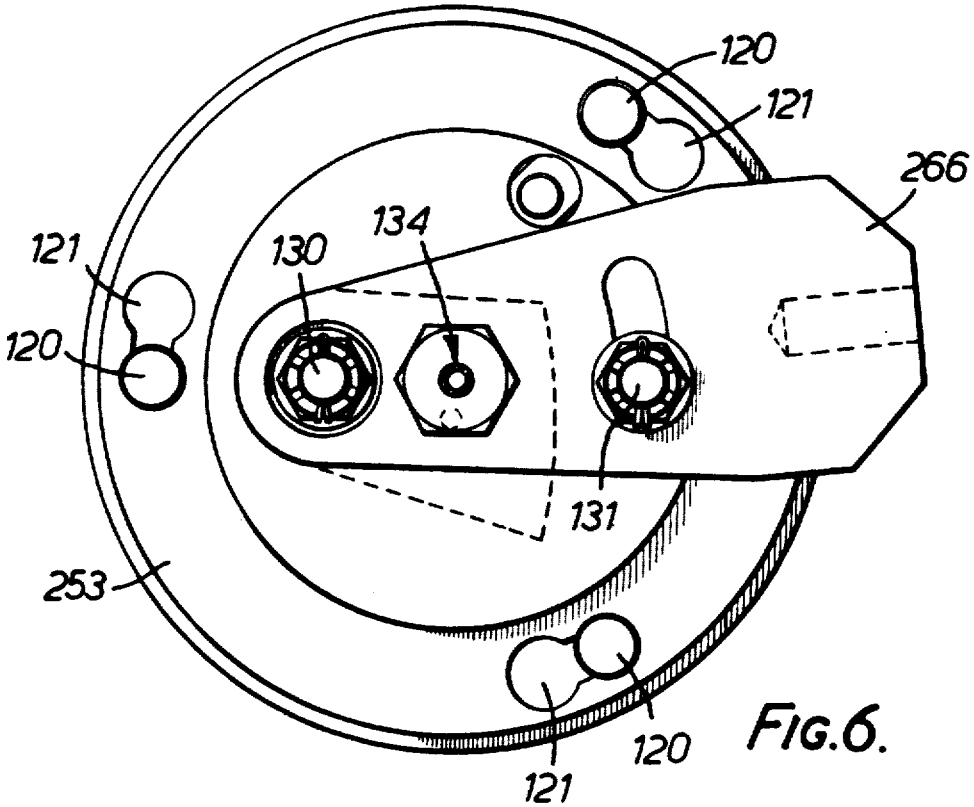
FIG. 6 is an end view of the apparatus shown in FIGS. 4 and 5.

Referring now to FIGS. 4 to 6, there is a vessel 215 for molten metal, for instance a ladle. The vessel 215 has an insulation-lined steel wall 214 of the vessel. The lining and wall are coincidentally apertured at 213, to provide a receiving opening for the apparatus 210. A refractory body 211 of the apparatus is tapered and so too is the receiving opening, so that mounting means 212 can urge the body 211 leak-tightly into its opening in the vessel 215.

The apparatus 210 can deliver the wire alloying or treatment material deep into the melt contained in vessel 215, and is therefore located adjacent the bottom thereof, but its precise location with respect to the bottom can again be varied as experience dictates.

At the heart of the apparatus 210 is the body 211; this has the form of a shouldered refractory plug and is made for example as a casting of refractory concrete. The body is encased in a metal can except for its opposite, inner and outer ends 111, 112 and its canned exterior makes a melt-tight fit with the aforesaid receiving opening. Body 211 is tranversed from end to end by a channel 2B for the wire. At least part of the length of the channel 2B is defined by a metal sleeve 227 extending inwardly from outer end 112 of body 211. The wire is a close sliding fit in the sleeve 227 which acts as a wire guide.

The body 211 is also traversed by a passage 115 which leads from the outer end 112 to the channel 2B just dwnwstream of the metal sleeve 227. Passage 115 is for conveying gas into the channel and ultimately into the melt.

The inner end of the body 211 has a recess concentric with the channel 2B. A blocking element, namely refractory disc 234 is seated in the recess blocking the channel. The disc 234 is preferably gas porous. The disc can be unseated from its recess by a forward thrust of the wire W.

To hold the body 211 in place, apparatus 210 includes a cover plate 253, a mounting ring 116 and an insert ring 117. The mounting ring 116 is secured to the mounting means 212 by bolts. The insert ring 17 is in turn bolted to the mounting ring 116 and provides a seating 118 for the shoulder 119 of the body 211. The mounting ring 116 has three bolts 120 screw-threaded thereto and the cover plate 253 has slotted apertures 121 for the bolts 120. It will be seen that the bolts and apertures function as a quick release bayonet-type coupling for securing the cover plate 253 to mounting ring 116. Disconnection of the plate from ring 116 permits removal of the body 211. The bolts 120 provide a convenient means for setting the force exerted by the cover plate on the body 211, urging the latter against its seating in the receiving opening and attaining leak-tightness.

The cover plate 253 has a central bore 124 aligned with channel B. Another bore 126 extends inwardly from the periphery of the cover plate 253 to a circular channel 127 therein, bore 126 being threaded for connection to a gas supply line. The channel 127 ensures gas fed along bore 126 enters the plug gas passage 115, irrespective of the relative angular orientations of the body 211 and plate 253.

A lever 266 is bolted on the outer face of the cover plate 253 for pivotal swinging movement to and fro about one of the two bolts 130, 131 by means of a crowbar, motor or hydraulic actuator, not shown. Also mounted on the bolts are disc springs which thrust the lever 266 firmly against the clamp cover plate 253. The lever 266 is fitted with a hardened steel bush 265. A similar bush 264 is fitted in the bore 124 of the cover plate 253. By forcing the lever 166 from a position in which the bushes 264, 265 are aligned, the bushes will coact to shear the wire W.

The lever 266 also has an anchorage 134, for a flexible guide tube 135 which feeds the wire W to the apparatus 210 from a conveniently-placed wire feeder F.

In use, the vessel 215 and apparatus 210 are set up as illustrated. Before, during or subsequent to filling vessel 215 with the melt to be treated, gas (such as argon) may be fed into the vessel via passages 126 and 115, channel 2B and disc 234 (provided the latter is porous). Assuming the gas is argon, it will help protect the wire W from oxidation. If the gas is passed subsequent to filling the vessel 215 but before wire injection it can serve diverse purposes. Some are listed early in this specification.

When the required alloy addition is to commence, the wire feeder F is set in operation. The wire W is then advanced along the flexible tube 135, through the aligned shear bushes 264, 265 and along the channel 2B. As it abuts the blocking disc 234, the moving wire will unseat the disc 234, enter and dissolve in the melt. When a calculated amount (or length) of wire W as required has entered the melt, the lever 266 is manipulated to sever the wire. Wire remaining in the channel 2B, together with gas pressure therein will conspire against the melt escaping from the vessel 215 following dislodgement of the blocking disc 234.

Further security against dangerous leakage of melt is gained by setting the lever 256 in a position in which its shear bush 265 is out of registry with the companion bush.

Once the vessel has been emptied, the wire left in the apparatus 210 can be removed, and the apparatus readied for re-use. The wire remnant could be ejected into the bottom of the vessel 215. Preferably, however, the clamp plate 253 will be disconnected from the mounting ring 116 and the body 211 will be removed. The wire remnant will then be ejected, normally in the wire feed direction, but conceivably it could be pulled in the reverse direction from the body. Before re-commissioning the body 211 a fresh blocking disc 234 will be installed.

In this apparatus, the only consumables are the wire, the refractory body 211 and blocking disc 234. The body should be able to last at least several fillings and emptyings of the vessel 215. Replacement cost will be modest, especially if the body is made from castable refractory concrete.

In some operations, it may not be necessary to feed wire into the melt. The apparatus 210 can then be used as a very convenient means to inject gas into the melt for purposes exemplified above, provided disc 234 is porous.

Figure 7:
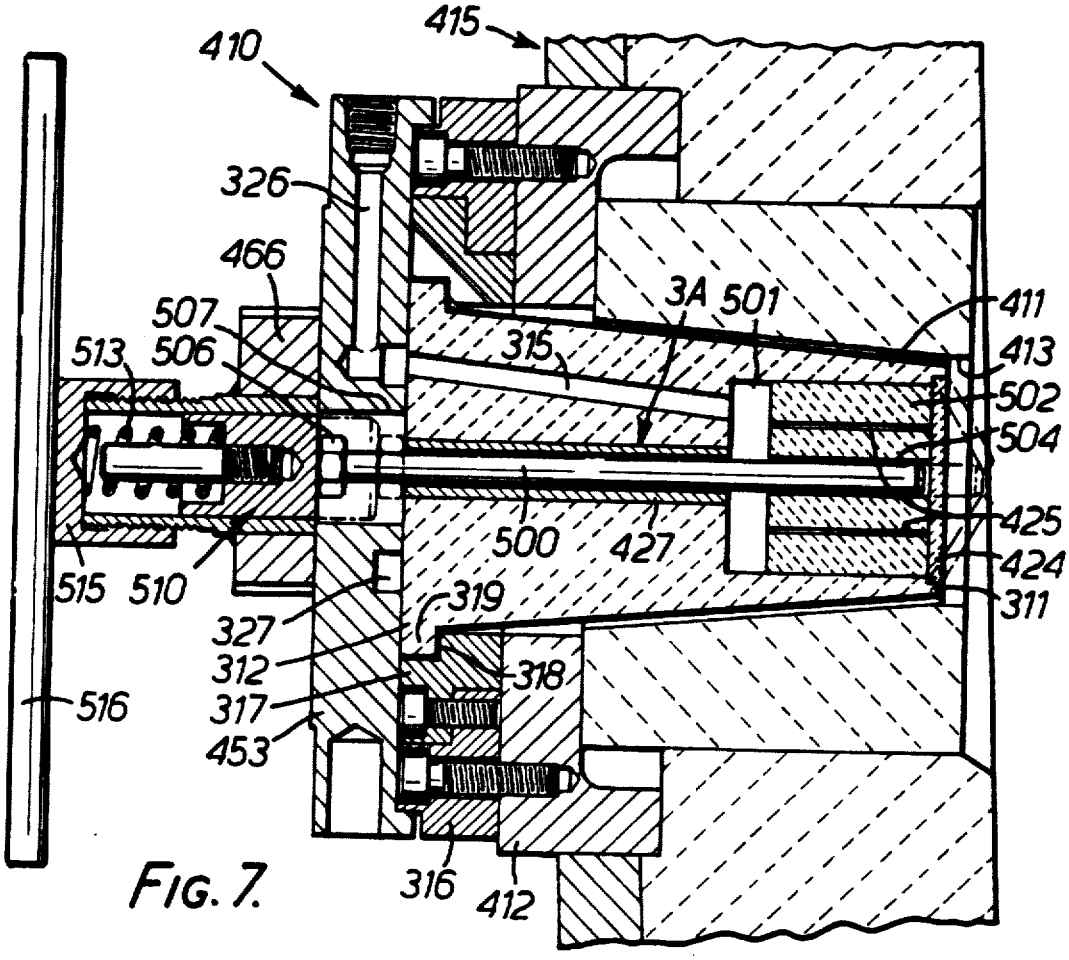
FIG. 7 is a fragmentary vertical sectional view through part of a vessel to which is fitted a gas-injecting apparatus.
Figure 8:
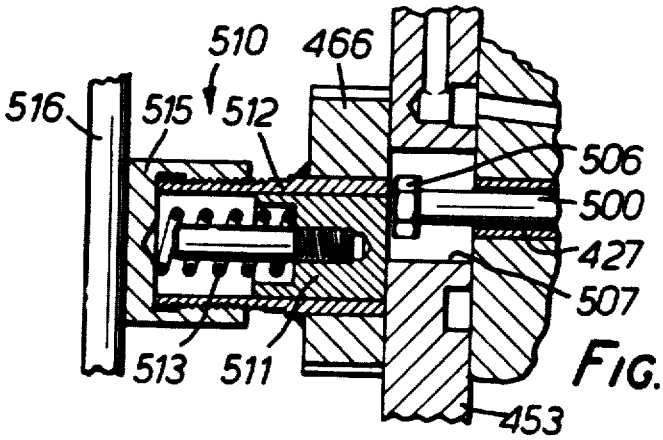
FIG. 8 is a fragmentary cross sectional view of a part of the apparatus shown in FIG. 7.

Another apparatus now to be described has features suitable for incorporation in the apparatus of FIG. 1. This apparatus is shown in FIGS. 7 and 8 and components thereof having counterparts in the last described apparatus are similarly numbered, but with fresh numerical prefixes. Thus, components previously numbered in the 100 and 200 series are for this apparatus numbered in the 300 and 400 series.

Referring now to FIGS. 7 and 8, apparatus 410 for injecting gas deep into a melt is shown attached to a vessel 415 for molten metal, for instance a ladle. The vessel 415 again has an insulated wall formed with a receiving opening 413 for the refractory body 411 of apparatus 410, which is secured to the vessel with the aid of mounting means 412. The body 411 and opening 413 are tapered as in the other embodiments.

As in the apparatus 211, the body 411 is a shouldered refractory article for example cast from high alumina refractory concrete. It is encased in a metal can except for its opposite, inner and outer ends 311, 312 and its canned exterior makes a melt-tight fit with the aforesaid receiving opening. The body 411 is traversed from end to end by a channel 3A in part defined by a metal sleeve 427 extending inwardly from the outer end 312. The sleeve 427 acts as a guide for a plunger rod 500.

The body 411 is also traversed by a passage 315 which leads from the outer end 312 to a recess or well 501 constituting an enlarged portion of channel 3A downstream of the metal sleeve 427. Passage 315 is for conveying gas into the well and ultimately into the melt.

The well 501, which is shown here to be central in the body 411 and coaxial with the passage 315, opens to the body inner end 311. The well of channel 3A forms a seating for a gas-distributing refractory or plug 502. A central bore 504 in the refractory 502 aligns with the channel 3A and the plunger rod 500 extends therefrom into the bore 504. The rod 500 terminates adjacent but short of the vessel end of the refractory 502, in its normal position.

The refractory 502, which is made of a high alumina material, is traversed longitudinally by a plurality of small bores 425 for conveying gas into the melt.

If desired the refractory 502 could be gas permeable or porous, able to pass gas without the need for bores 425.

The inner end 311 of the body 411 also has a superficial recess concentric with the well 501 and channel 3A. A high alumina, cast or fired melt-resisting disc 424 is seated in the recess, shielding the refractory body 411 from contact with molten metal until gas injection is commenced. At that time, the disc will be unseated from its recess or broken by a forward thrust of the plunger rod 500. Actuation of the plunger rod 500 will be described hereafter.

The body 411 is held in the opening 413 by an assembly of metal components which feature a cover plate 453 secured by a quick-release bayonet coupling. The components and their assembly are the same as in the last-described embodiment, so no further description will be given here.

Once again, the cover plate 453 has a gas passage 326 and circular gas channel 327 for feeding gas, to a passage 315 in body 411, irrespective of the relative angular orientations of the body 411 and the cover plate 453.

As in the apparatus 210, there is an apertured lever 466 bolted on the outer face of the cover plate 453 for limited swinging movements to and fro by means of a handle insertable in a socket in the lever.

Swinging the lever in one direction actuates the plunger rod 500 to strike the shielding disc 424 for passage of gas into the vessel 415.

As shown, the plunger rod 500 is an elongated member having an enlargement 506 at its end remote from the disc 424. In one convenient form, the plunger rod 500 is a hexagonal headed bolt guided for sliding movement in the sleeve 427.

The enlargement 506 is housed in a central opening 507 of the plate 453 in a position where it may be engaged by a striker 510 for driving the plunger rod 500 to the right against the shielding disc 424.

The striker 510 is a spring-pressed piston 511 movable in a cylinder 512 welded—or otherwise secured—to the lever 466. A spring 513 acts between the piston 511 and an end cap 515 screw-threaded to and closing the cylinder 512. For convenience in adjusting the end cap 515, a handle 516 is secured thereto.

Before actuation of the plunger rod 500 to break or unseat the disc 424, the rod 500 is in a leftward position with its enlargement 506 spaced from the end 312 of the body 411. See FIG. 8. The opposite end of the rod 500 is set back from the disc 424. The piston 511 at this time is in a retracted or cocked position, with the spring 513 compressed. The lever 466 is in a "ready" position at one of its two limit positions. In this state, the piston 511 is out of registry with the opening 507. The opening 507 being only slightly larger than the piston 511, the striking face of the piston 511 abuts the outer face of the cover plate 453. Accordingly, the piston and its spring are held cocked.

When the lever 466 is moved from the first towards its second limit position, the cylinder 512 fast therewith forces the piston striking face to slide across the face of the cover plate 453 towards registry with the opening 507. As the striking face slips from contact with the cover plate into registry with the opening, the piston is immediately driven forwards by the spring 513. The piston thus strikes the enlargement 506 to thrust the rod 500 forward to unseat or break the disc 424. Gas supplied to the well 501 via passages 326, 315 can then flow into the melt after passage through the refractory 502.

Once the vessel 415 has been emptied of melt, the apparatus 410 can be readied for re-use, in a manner generally as described with reference to apparatus 210. Disc 424 and rod 500 will need replacing each time the vessel is emptied, but the body 411 will probably be reusable several times. It may be necessary to replace refractory 502 each time the vessel is emptied.

Before reassembling the apparatus 410, the piston 511 will have to be returned to its cocked position with the spring 513 acting thereon. To do this, the end cap 515 is spun in an unthreading direction by handle 516 to relieve the spring pressure on the piston. The lever 466 is then swung towards its starting or original limit position and the piston striking face placed against the outer face of the plate 453 as shown in FIG. 8. Once the piston face is so placed, the spring pressure can be restored appropriately on the piston 511 by spinning the end cap in the threading direction. Reassembly of the apparatus 410 can then commence, the routine being substantially as described with reference to the last embodiment. Care should be taken to avoid displacing the lever 466 during reassembly, otherwise the striker 510 could be fired prematurely. To guard against this, a removable safety pin or some other safety lock could be provided to hold the lever 466 against premature displacement.

Modifications

Numerous modifications are possible and some will now be described. Others will occur to the those skilled in the art.

The refractory bodies 11, 211, 411 are shown to be metal encased, but if due care is exercised in their manufacture, so that their surfaces are adequately true and smooth, no encasement may be needed.

The relative positions of channels A, B and C can be varied as noted above.

In some cases chemists or metallurgists may want to feed wire or powder in stages or to introduce more than one wire/powder composition. The refractory body 11 and plug 21 can then be adapted to include further channels equivalent to channels B and C. Each further channel will have an installed blocking element and appropriate means to push said element aside and open the channel for delivery into the vessel.

If desired, extra gas injection channels A can be provided. The one or each channel A might feed gas directly to the melt, thus beneficially eliminating the plenum chambers 22, 501 and the capillary passages 25, 424. In such an arrangement, the bullet 38 will be grooved or ribbed lengthwise—or otherwise designed—to pass gas from the pipe 36 into the melt. In this modification, the gas will issue from bore 30. The bore will contain a dislodgeable blocking element or plug up to the time gas injection starts. Desirably, the bullet and pipe will be smaller than bore 30. Then it will be possible to flush air from the bore while cooling it and the blocking element prior to the gas injection operation.

The bullet 38 could be omitted if the gas pipe 36 is lengthened appropriately. The end of the pipe will then dislodge the shield/blocking element.

If the plenum chamber 22 of the first embodiment is eliminated, channel A can no longer supply gas to wire-delivery channel B. The latter channel will then have a separate gas supply: greater flexibility in operation will be gained. Gas will be fed into tube 27 at any convenient point and not necessarily in the manner shown in FIG. 4. It will pass down the tube around the wire therein, the wire ordinarily being appreciably smaller than the tube.

As described above, the wires fed along channels B, 2B are utilised to displace the blocking elements 34, 234. Some wires may be too lacking in rigidity to thrust these elements aside. The channels B, 2B could then be modified by the addition of axially-movable wire guide tubes. Such tubes would be employed to unseat the elements 34, 234. Means to mount and move the tubes could be as illustrated and described in connection with powder delivery channel C.

Such a guide tube could comprise an outer steel tube around a coaxial inner tube e.g. made of refractory material. The space between said tubes may contain a refractory filling. The guide tube would be advanced into the melt when wire feeding is to start. Since there may be a delay between advancing the guide tube into the melt and the wire reaching the melt, run-back of melt might happen. This can be prevented by installing a close-fitting push-out rod in the end of the inner tube. The rod will be pushed out into the melt when the wire pushes against it.

In a convenient arrangement, gas is fed into the movable guide tube at or adjacent its outer end, the wire initially extending only part-way along the tube. To commence a wire-feeding operation, the tube is advanced to dislodge the channel-blocking element and gas is caused immediately to flow from the tube into the liquid. There will be a delay before the wire reaches the liquid. The gas entering the tube has to flow around the wire and, at the point in the tube where it passes the end of the wire, it will decelerate. The decelerated gas flow entering the melt may be too slow to prevent run-back. To avoid the possibility of run-back up to the time the wire reaches the liquid, a temporary, obturator can be installed in the tube adjacent its liquid-confronting end. The obturator, which restricts the space available to gas flow, accelerates the gas to a velocity ensuring gas jets rather than bubbles into the liquid. The obturator can be a solid cylindrical metal element having the same diameter as the wire. The element has legs frictionally engaging the inside of the tube to prevent its displacement prematurely by the gas. The frictional engagement permits the obturator to be thrust into the liquid, however, by the wire about to enter the liquid. The obturator can be made simply by slitting a metal rod to form, say, four legs which are bent outwards for engaging the tube.

It may not be convenient for the user to be limited to feeding wire of a set diameter along channel B. He may well wish to use wire of different diameter at different times. Diameters could range, for instance, from 4.5 to 12 mm. A small diameter wire might well buckle during feeding, upon it striking the blocking element 34, in the apparatus 10 and 210 shown in FIGS. 1 and 4. This might well lead to a jam. A simple adaptation of the illustrated apparatus will avoid the risk of buckling.

According to this adaptation, an inner support tube for the wire will be mounted inside the tube 27, 277. The inner support tube will extend from the outer, righthand end of tube 27, 277 into close proximity to either the inner face of plug 21, confronting the bottom of well 22, or the blocking element 234. Aligning spacers fitting closely in tube 27, 227, and e.g. fast with the support tube, locate it coaxially inside the tube 27, 227. Said spacers can be located adjacent the ends of the support tube, and also at intermediate positions if desired. The outer end of tube 27, 227 may be counterbored to receive a spacer larger than the i.d. of the main part of the tube 27. With such an arrangement correct positioning of the support tube lengthwise of the tube 27 is assured.

It is contemplated that an inner support tube will be provided for each wire size to be fed. Each tube will have an i.d. affording unhindered movement of its associated wire. The support tubes will have spacers of common external dimensions.

Such inner support tubes may be especially beneficial for feeding wires consisting of thin-walled steel tubing packed with alloying or treatment additions in particulate form.

As intimated above, a movable tube could be used to unseat the blocking element 34, 234 and the support tubes just described could be so constructed and organised to effect unseating.

When apparatus 10 is used, it will generally be impractical to delay injection of gas alone until after wire or powder has been injected. This is because the first injection operation will dislodge the disc 34 and expose the capillaries 25. Melt may run into them and block them preventing later gas injection. For this reason, the modification involving direct gas injection via bore 30 is preferable. In such a modification, each channel will terminate in a dislodgeable blocking element, and thus the channels may be brought into operation in any sequence. The shielding disc 24 could be omitted (as each channel is blocked until operated). However, the shielding disc would probably be retained anyway due to the protection it affords to the melt end of body 11. Its pressure is thought important when the apparatus is installed in vessels which are subjected to extended pre-heats.

With regard to the powder supply channel C, the cap 92 could be omitted if valving is provided to control the onset of powder supply. In the absence of cap 92, it would be desirable in use to flush the supply pipe 91 thoroughly before the gas/powder mix is admitted.

Conveniently, the two ducts incorporating channels B, C are of identical dimensions and the cover plate 53 will be arranged so that their functions may be interchanged. Then, the user can install two wire feeders or two powder feeders if he wishes.

In modifications of the FIGS. 1 and 7 apparatus 10, 410 which have no plenum or chamber 22, and in which gas is fed from duct or channel A direct into the melt, plugs 21, 502 could be omitted. The inner ends of bodies 11, 411 contact the melt and this is more or less aggressive depending on its nature. For this reason, it may be advantageous to have a separate inner end for the body, the end being replaced after each emptying of the vessel while the body itself is reused.

In embodiments of the invention having plugs 21, 502, it could be helpful for them and the bodies 11, 411 to have radial bores to receive aligning dowels.

Industrial Applicability

The invention is applicable for introducing substances to aggressive liquids and melts which are at high temperatures, such as molten metals. Thus, the invention can, for instance, be used in ferrous metallurgy for introducing gaseous, solid or particulate materials into molten steel or iron, for various purposes. Thus, using the invention one can introduce alloying elements, especially readily volatilisable elements such as aluminium and potentially hazardous, volatilizable elements such as lead. Substances used for grain refinement or for controlling carbide formation can be introduced similarly. Likewise, the invention can be used to introduce substances used e.g. to desulphurise, desiliconise or dephosphorise the melt.

We claim:

1. Apparatus suitable for introducing selected substances into an elevated temperature liquid, comprising:

a refractory body adapted to be installed in a wall of a liquid container below the liquid surface, the body being traversed between outer and liquid-confronting ends of the body by a plurality of passages each for conveying different, selected substances to the liquid;

dislodgeable, refractory passage-closing means for each of said passages in the refractory body, and located at the liquid-confronting end of the body to prevent liquid in said container from entering the passages;

elements each movable independently of one another and located in a different one of said passages to engage with the closing means associated with the respective passage; and a plurality of actuating means at said outer end of the refractory body and selectively operative to propel the corresponding movable elements toward the associated closing means to dislodge the closing means and open the corresponding passage so that feeding of a selected substance introduced within the passage into the liquid will commence;

said actuating means being operative to open the passages in a chosen order so that the selected substances can be fed into the liquid in said chosen order.

2. Apparatus according to claim 1, wherein the closing means includes a protective refractory shield which substantially covers the liquid confronting end of the body.

3. Apparatus according to claim 1, wherein the closing means comprises, in combination, a refractory plug dislodgeably seated in the end of an associated passage and a protective refractory shield which substantially covers the liquid confronting end of the body.

4. Apparatus according to claim 1, wherein said refractory body has a gas-feeding passage, a first wire feeding passage and one of a gas/powder mixture and a second wire feeding passage.

5. Apparatus according to claim 1, wherein one passage, for introducing a gas into the liquid, has a gas pipe therein, said pipe forming one of said movable elements responsible for dislodging the closing element associated with said one passage, said gas pipe projecting outwardly from the outer end of the refractory body for connection to an external pipe-displacing mechanism which forms said actuating means.

6. Apparatus according to claim 5, wherein said gas pipe terminates in abutment means near said liquid-confronting end, and said abutment means is adapted to permit gas to flow freely therearound as the gas progresses toward the liquid in the container.

7. Apparatus according to claim 5, wherein said gas pipe terminates in abutment means near said liquid-confronting end, said abutment means is received slidably in a guiding bore at the liquid-confronting end of the refractory body, said guiding bore providing the abutment means with access to the associated closing element, and said refractory body has a plenum into which said gas pipe discharges gas and capillary passages opening at said liquid-confronting end for conveying gas from the plenum to the liquid in the container.

8. Apparatus according to claim 5, wherein the actuating means is a spring-loaded striking mechanism operative to drive the corresponding movable element in a forward stroke against the associated closing element, so that said one passage is opened for flow of gas to the liquid in the container.

9. Apparatus according to claim 1, wherein one passage, for introducing to the liquid material selected from a fluidized mixture of powder and gas, and a wire strand, has a tube displaceably mounted in said one passage along which tube the selected material is passed, said tube extending outwardly at the outer end of said refractory body for connection to means for supplying the selected material, and said actuating means includes a movable tube carrier for supporting the outwardly extending portion of the tube.

10. Apparatus according to claim 9, wherein the tube carrier is supported by a mounting of the apparatus, and a pivoted lever engaged with the carrier is operative to advance the tube carrier and tube in the direction toward the associated closing element.

11. Apparatus according to claim 9, wherein the tube has a temporary closure at the liquid-confronting end thereof, said temporary closure being disintegratable upon contact with a high temperature liquid in the container.

12. Apparatus according to claim 9, wherein said tube comprises a tubular composite having an inner refractory tube housed within an outer metal jacket, a space between said tube and jacket containing a refractory packing, and the inner tube at its liquid-confronting end is temporarily blocked to ingress of liquid when the actuating means is operated, a blockage at said end being readily expelled therefrom.

13. Apparatus according to claim 1, wherein one passage, for introducing a substance in the form of a wire strand into the liquid, employs the wire as said movable element responsible for dislodging the associated closing element, and the actuating means is a wire feeder, means being provided for optionally admitting gas to said passage so that wire can be introduced into the liquid optionally and simultaneously with gas.

14. Apparatus according to claim 9, wherein a shear is mounted at the outer end of said refractory body for shearing wire on completion of a wire-feeding operation, said shear comprising a pair of aligned shear bushes each apertured to allow the wire to move therethrough, and a mechanism is provided for displacing one bush laterally relative to the other to sever the wire on completion of a wire injection operation.

15. Apparatus according to claim 13, wherein a shear is mounted at the outer end of said refractory body for shearing wire on completion of a wire-feeding operation, said shear comprising a pair of aligned shear bushes each apertured to allow the wire to move therethrough, and a mechanism is provided for displacing one bush laterally relative to the other to sever the wire on completion of a wire injection operation.

16. A method of introducing a substance into an elevated temperature liquid, comprising:

providing a container for containing the elevated temperature liquid;

providing a receiving opening in the container below the level of the elevated temperature liquid;

introducing a refractory body into the receiving opening of the container and providing the refractory body with a plurality of passages between outer and liquid-confronting ends of the body;

adapting each of the passages in the refractory body for conveying different, selected substances to the liquid in the container;

placing dislodgeable, refractory passage-closing means for each of the passages in the refractory body, and locating the closing means at the liquid-confronting end of the body thereby preventing liquid in the container from entering the passages;

locating a number of elements each in a different one of the passages for displaceable movement independently of one another and arranging each element to engage with the closing means associated with the respective passage;

providing a plurality of actuating means at the outer end of the refractory body and arranging the actuating means for selective operation to propel the corresponding movable elements toward the associated closing means thereby dislodging the closing means and opening the corresponding passage to allow feeding of a selected substance into the liquid in the container;

arranging the actuating means to operate so that the passages are opened in a chosen order and the selected substances can be fed into the liquid in said chosen order; and feeding the selected substance along one of the passages in the refractory body and into the liquid in the container.

17. The method of claim 16, including providing a metal melt in the container as the elevated temperature liquid; and treating the metal melt by introducing substances selected from gases, solids and powders through the passages of said refractory body, whereby at least one of the purity, composition and microstructure of the metal after solidification, are controlled as a result of the feeding step.

*18. A method of introducing additive material into liquid held in a container at elevated temperature comprising the steps of:*

*providing said container, prior to introducing said liquid therein, with a receiving opening below the normal level of elevated temperature liquid intended to be held therein;*

*introducing a refractory body into the receiving opening of the container, said body being provided with a plurality of passages between outer and liquid-confronting ends of said body, each passage having passage closing means blocking the passage for preventing elevated temperature liquid from entering said passage and also having an element therein adapted to displace said closing means from said passage for unblocking and thereby opening said passage;*

*securing said refractory body to said container so as to sealingly plug said receiving opening therewith;*

*connecting said passages with means for supplying thereto said additive material for introduction into said passage and ultimately into said liquid;*

*operatively associating said elements of said passages with selective actuating means at the outer end of said refractory body;*

*operating said actuating means to produce opening of said passages each at a given chosen time; and*

*feeding said additive material for a predetermined time or in predetermined quantity from said supply means through each passage, following the opening thereof, into said elevated temperature liquid in said container.*

*19. The method of claim 18 including the steps of providing molten metal in said container as said elevated temperature liquid and introducing additive material which alters at least one of (a) the purity, (b) the composition and (c) the microstructure of said metal.*

*20. A metallurgical method for introducing injectant material into molten metal held in a container, comprising the steps of:*

*before introducing said molten metal into said container, sealingly inserting a refractory body in a receiving opening in said container located below the intended level of said molten metal, said body providing a plurality of injection passages extending between outer and molten metal-confronting ends of said body;*

*providing each of said passages with passage-closing means to block entry of said molten metal into said passages upon introducing said molten metal into said container;*

*connecting one of said passages with an injectant supply means and causing an actuating means to apply a force to the closing means of said passage to remove the closing means from the passage-blocking position thereof and allow injectant to pass from said passage into said molten metal;*

*when injection of said injectant is adjudged complete, terminating the supply of said injectant to said passage and permitting said passage to become blocked again;*

*at subsequently selected times, repeating for the other of said passages the steps of connecting one of said passages with an injectant supply means and causing an actuating means to apply a force to the closing means of said passage to thereby allow injectant to pass from said passage into said molten metal and when injection of said injectant is adjudged complete, terminating the supply of said injectant to said passage and permitting said passage to become blocked again.*

*21. A method according to claim 20 wherein said passages are permitted to become blocked by allowing molten metal from inside said container to enter said passages and freeze therein.*

*22. A replaceable refractory for use with an apparatus suitable for introducing selected material into an elevated temperature liquid comprising:*

*a refractory body adapted to be installed in a wall of a liquid container below the liquid surface within said container,*

*said body being traversed between outer and liquid confronting ends of said body by a plurality of passages for conveying selected material to the liquid,*

*refractory passage closing means for each of said passages in said refractory body,*

*said refractory passage closing means being located at the liquid confronting end of said body to prevent liquid in said container from entering said passages,*

*said closing means being formed so that at least a portion of said closing means is forced into said liquid container by elements movable within the respective passages within said body to thereby open said passages into communication with said liquid.*

*23. The replaceable refractory of claim 22 wherein said refractory body has a frusto conical outer portion at the liquid confronting end thereof, said frusto conical portion being proportioned to engage a mating surface in said container.*

*24. The replaceable refractory of claim 22 wherein a collar is formed on the periphery of said refractory body outer end to limit the longitudinal movement of said body relative to said container.*

*25. The replaceable refractory of claim 23 wherein a collar is formed on the periphery of said refractory body outer end to limit the longitudinal movement of said body relative to said container.*

*26. A replaceable refractory for use with an apparatus for introducing supplements of additive material into elevated temperature liquid comprising:*

*a refractory body adapted to be installed in a wall of a liquid container below the liquid surface,*

*said body being traversed between outer and liquid confronting ends of said body by a plurality of passages oriented parallel to the axis of said body for conveying*

*supplements of additive material to elevated temperature liquid in said container at preselected times,*

*passage closing means blocking each of said passages in said refractory body,*

*said closing means being located near the liquid confronting end of said body to prevent liquid in said container from entering said passages,*

*said refractory body having a frusto conical container-engaging outer surface adjacent said liquid confronting end, and*

*said refractory body having an annular collar formed adjacent said outer end for orienting said refractory body within said container wall.*

*27. The replaceable refractory of claim 26 wherein each of said passages are uniformly spaced radially relative to the others, and each of said passages receives an element which selectively forces at least a portion of said closing means into said liquid container to thereby open said passages into communication with said liquid.*

*28. A steel pipe having a refractory lining adapted to be positioned for longitudinal movement within a longitudinal passage in a refractory body that is installed in a wall of a liquid container containing elevated temperature liquid below the liquid surface thereof whereby said steel pipe may be forcefully moved within said longitudinal passage to open said passage into communication with said elevated temperature liquid and whereby selected material may be introduced into said liquid through said steel pipe after said passage has been opened.*

*29. The steel pipe of claim 28 wherein said refractory lining is formed of mullite.*

*30. The steel pipe of claim 29 wherein the inside diameter of said pipe with the lining therein is one-quarter inch.*

*31. Apparatus for introducing supplements of additive material into elevated temperature liquid, comprising:*

*a refractory body adapted to be installed in a wall of a liquid container below the liquid surface, the body being traversed between outer and liquid confronting ends of the body by a plurality of passages for respectively conveying separate supplements of additive material to elevated temperature liquid in said container at a time independently selectable for each said supplement;*

*passage closing means blocking each of said passages in the refractory body, located at or near the liquid-confronting end of the body to prevent liquid in said container from entering the passages;*

*elements each movable independently of one another and each located in a different one of said passages to displace the closing means associated with the respective passage for unblocking the respective passage.*

*32. A replaceable refractory for use with an apparatus suitable for introducing selected material into an elevated temperature liquid comprising:*

*a refractory body adapted to be installed in a wall of a liquid container below the liquid surface within said container,*

*said body being traversed between outer and liquid confronting ends of said body by a plurality of passages for conveying selected material to the liquid.*

*33. A replaceable refractory for use with an apparatus for introducing supplements of additive material into elevated temperature liquid comprising:*

*a refractory body adapted to be installed in a wall of a liquid container below the liquid surface,*

*said body being traversed between outer and liquid confronting ends of said body by a plurality of passages oriented parallel to the axis of said body for conveying supplements of additive material to elevated temperature liquid in said container at preselected time,*

*said refractory body having a frusto conical container-engaging outer surface adjacent said liquid confronting end, and*

*said refractory body having an annular collar formed adjacent said outer end for orienting said refractory body within said container wall.*

* * * * *